(12) United States Patent
Pettie et al.

(10) Patent No.: US 10,482,715 B2
(45) Date of Patent: Nov. 19, 2019

(54) VIDEO SLOT GAMING SYSTEM WITH POSITIVE ACTING COLLECTIBLE SYMBOLS AND COLLECTABLE EVENT TERMINATION SYMBOLS

(71) Applicants: Troy Pettie, Las Vegas, NV (US); Zachary Tompkins, Henderson, NV (US)

(72) Inventors: Troy Pettie, Las Vegas, NV (US); Zachary Tompkins, Henderson, NV (US)

(*) Notice: Subject to any disclaimer, the term of this patent is extended or adjusted under 35 U.S.C. 154(b) by 80 days.

(21) Appl. No.: 15/871,348

(22) Filed: Jan. 15, 2018

(65) Prior Publication Data

US 2018/0218573 A1    Aug. 2, 2018

Related U.S. Application Data

(60) Provisional application No. 62/452,301, filed on Jan. 30, 2017.

(51) Int. Cl.
| | |
|---|---|
| *G07F 17/32* | (2006.01) |
| *G06F 7/58* | (2006.01) |
| *G06Q 50/34* | (2012.01) |

(52) U.S. Cl.
CPC .......... *G07F 17/3267* (2013.01); *G06F 7/58* (2013.01); *G06Q 50/34* (2013.01); *G07F 17/3211* (2013.01); *G07F 17/3213* (2013.01); *G07F 17/3246* (2013.01); *G07F 17/3248* (2013.01); *G07F 17/3258* (2013.01); *G07F 17/3293* (2013.01)

(58) Field of Classification Search
USPC ......................................................... 463/20
See application file for complete search history.

(56) References Cited

U.S. PATENT DOCUMENTS

| | | | | |
|---|---|---|---|---|
| 7,264,243 B2 * | 9/2007 | Yoseloff | ............. | A63F 3/00157 |
| | | | | 273/274 |
| 8,257,161 B2 * | 9/2012 | Louie | ..................... | G07F 17/32 |
| | | | | 463/16 |
| 8,272,958 B2 * | 9/2012 | Smith | ................. | G07F 17/3211 |
| | | | | 463/11 |

(Continued)

*Primary Examiner* — Pierre E Elisca
(74) *Attorney, Agent, or Firm* — Mark A. Litman & Associates, P.A.

(57) ABSTRACT

A method and system implement a wagering event on an underlying wagering event using a processor, memory, video display, player input controls and player value-in-value-out system. The method includes:
  a player position committing a wager on an underlying wagering event randomly distributing available into areas distributed along paylines;
  the processor distributing symbols along paylines;
  the symbols including at least two classes of collectible symbols: a first class of symbol having positive game content effects upon collection of a first predetermined number of the first symbols, or a second class of symbol having an elimination effect on the first class of symbols upon collection of a second predetermined number of the second symbols; and
  the processor enabling beneficial payout effects when the first predetermined number of the first symbol is reached and at least some collected first symbols eliminated upon collection of the second predetermined number of the second symbols.

20 Claims, 8 Drawing Sheets

(56) References Cited

U.S. PATENT DOCUMENTS

2009/0075722 A1\* 3/2009 Louie .................. G07F 17/32
            463/20
2015/0065224 A1\* 3/2015 Aoki .................. G07F 17/34
            463/20

\* cited by examiner

VIDEO SLOT GAMING SYSTEM WITH POSITIVE ACTING COLLECTIBLE SYMBOLS AND COLLECTABLE EVENT TERMINATION SYMBOLS

RELATED APPLICATION DATA

This Application claims priority from U.S. Provisional Patent Application Ser. No. 62/452,301, filed 30 Jan. 2017 and Titled "VIDEO SLOT GAMING SYSTEM WITH POSITIVE ACTING COLLECTABLE SYMBOLS AND COLLECTABLE EVENT TERMINATION SYMBOLS."

BACKGROUND OF THE INVENTION

1. Field of the Invention

The present technology relates to video wagering games and events and systems using random symbol generation, processors, video displays and paylines for symbol display.

2. Background of the Art

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

US Published Patent Application No. 20160364956 (Saunders) discloses a gaming system and method providing a slot game and enabling accumulation of graphical image symbols. Generally, in various embodiments, the gaming system enables a player to accumulate graphical image symbols during play of the slot game and, when a complete set of the graphical image symbols is accumulated such that a graphical image associated with that complete set is displayed, provides a feature to the player. The gaming system of the present disclosure thus encourages players to continue play of the slot game to attempt to accumulate a complete set of the graphical image symbols such that the gaming system provides the feature.

SUMMARY OF THE INVENTION

A method and system implement a wagering event on an underlying wagering event using a processor, memory, video display, player input controls and player value-in-value-out system. The method includes:
  a player position committing a wager on an underlying wagering event randomly distributing available into areas distributed along paylines;
  the processor distributing symbols along paylines;
  the symbols including at least two classes of collectible symbols: a first class of symbol having positive game content effects upon collection of a first predetermined number of the first symbols, or a second class of symbol having an elimination effect on the first class of symbols upon collection of a second predetermined number of the second symbols; and
  the processor enabling beneficial payout effects when the first predetermined number of the first symbol is reached and at least some collected first symbols eliminated upon collection of the second predetermined number of the second symbols.

DETAILED DESCRIPTION OF THE INVENTION

Figure 1:
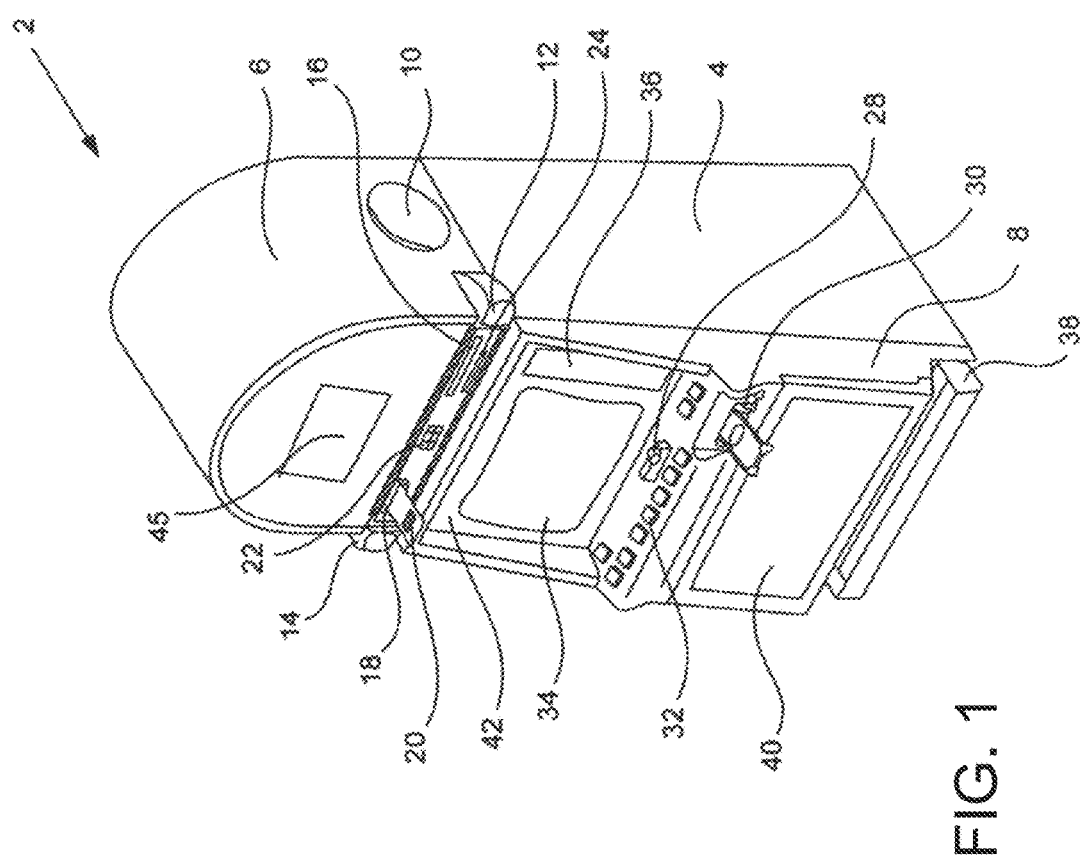
FIG. 1 shows an electronic gaming table on which the gaming method may be executed.

The present technology is intended to operate as an overlay on a relatively standard video reel slot gaming apparatus. The underlying gaming apparatus will have anywhere from 3×3 to 5×5 frames displayed on the display screen. Paylines may be linear or non-linear paylines and scatter-pay functions may also be used. Any theme may be used in the play of the underlying game, from standard and traditional symbol displays (e.g., bars, cherries, lemons, bells, oranges, plums, and the like) to more modern literature, movie, video game or television show themes can be used.

The underlying wagering event can be played in its standard manner, with the virtual wheels randomly displaying symbols displayed in frames along paylines. Traditional payout events are achieved, usually by event outcomes from the random distribution of symbols in the frames when they display winning combinations in the underlying gaming event. Such winning outcomes typically, but do not exclusively include multiple same symbols (with or without wild symbols) in a consecutive order along a payline. Typically the order must begin on a left hand column edge, although as noted herein, any underlying gaming event, beginning in any position (e.g., non-linear paylines and scatter pay lines) may be used. For example, at least three same symbols up to at least five same symbols in a linear (or non-linear) pattern along an engaged (paid for) payline can produce a win. The underlying gaming event is then played according to its normal rules and events (although payout rates and amounts may be adjusted to accommodate higher payouts without additional wagering on the special events of the present technology).

When there are winning outcomes of consecutive symbols in the underlying gaming event (using equivalents of a first class of symbols as later defined), at least some of those winning outcomes will generate collectible first symbol events with winning outcomes. For example, if there are three consecutive bars as a winning event, there is a dedicated collection area available for display of collected collectible symbols on the display screen. For the three consecutive bars, 1, 2 or 3 bars (depending on gaming event rules or procedures) are added into the dedicated collection area for bars. When bars are collected, they may have immediate or delayable benefits on outcomes of the underlying game winnings or outcomes, or potential outcomes. For example, with three collected first symbols of a specific type of symbol (such as the bars), the collected symbols may be traded in for a single minimum wagering unit spin on the underlying game. The collected symbols may have to be traded in to achieve that result on the next spin. If five bars have been collected, the five bars collected may be traded in for either a two minimum wagering unit next spin, or for the next spin to have a higher paytable available. As more collectible symbols are accumulated, and as different symbol types are collected, higher value trading potential using the symbols can be accumulated. The game may be configured to allow the user to apply the collected benefit after the result of a spin has been revealed thus improving the payout. This procedure cannot progress without limitation or without reduction in the collected symbols, so there is a countering event in the collection of second collective symbols.

The second collectible symbols may either be collected from random (scatter) appearance of symbols during the underlying gaming event or patterned displays. Again, and even more particularly with the second symbols, single second collectible symbols may be achieved and collected one-at-a-time or multiple ones at a time. The second collectible negative effects should occur only when a specific predetermined number (e.g., at least 2, at least 3 etc.), and when that specific predetermined number of collectible second symbols is achieved, all first collective symbols are eliminated from their dedicated collection area. The effect of the negation or elimination of all first collected symbols may be done in either of two ways. The first way is that all future or prospective activity from the first collected symbols may be permanently ended. The second way is that if the second predetermined number of second symbols is achieved during a spin when the first collectible symbols have been committed to the underlying game outcome, the achievement of that predetermined second number will also deactivate the effect of the dedicated first symbols on the current underlying game.

The ability of a player to determine when and at what level collected first symbols (one type or all types, separately or together) while dreading appearance of negative-acting second symbols can add increased drama to the gaming event. If second symbols are awarded one-at-a-time, players can feel comfortable attempting to further accumulate first symbols to gain higher benefit potential, and there are no first symbols yet accumulated, there is no tension. However, if the second predetermined number is three, and the player position has accumulated two second collectible symbols, the player may feel pressure to exercise any ability available with collected first collectible symbols.

Second collectible symbols, up until such time as the second predetermined number is collected, may also act to diminish the value of collected first collectible symbols. For example, if there are seven collected first collectible symbols of a specific type and function, the presence of one collected second symbol could be used to diminish the effect of the seven collected collectible first symbols to six first symbols. Two collected second collectible symbols could likewise diminish the effect by two or even more first collectible first symbols.

These and other aspects of the present technology will become more apparent with further descriptions as follows.

A method of implementing a wagering event on an underlying wagering event according to the present technology may include using a processor, memory, video display, player input controls and player value-in-value-out system. The method may include:

a player position committing a wager on an underlying wagering event through the player input controls based on random event outcomes generated by random distribution of available symbols stored in memory, the distribution being into areas distributed along paylines;

the processor distributing symbols on the display screen of individual random symbols to the areas distributed along paylines at a player position with a committed wager;

distributing of random symbols to the areas distributed along paylines at the player position, the symbols including the possibility of at least two classes of collectible symbols, the collectible symbols can have either comprise a first class of symbol having positive game content effects upon collection of a first predetermined number of the first symbols, or a second class of symbol having an elimination effect on the first class of symbols upon collection of a second predetermined number of the second symbols; and the processor enabling economically beneficial payout effects on winning outcomes or stored credit when the first predetermined number of the first symbol is reached and at least some collected first symbols eliminated upon collection of the second predetermined number of the second symbols.

The method may be executed on an electronic gaming system including a main processor, video display system, a memory including content of virtual images for the random symbols, player input controls, and a value-in and value out system that received physical input relating to value committed to the committed wager. The method may be executed on a single player position electronic slot machine having a value-in-value out system selected from the group consisting of ticket-in-ticket-out input comprising a ticket reader and a ticket printer, a currency accepting system comprising a currency reader and a signal generator to the processor indicating accepted value credit for wagering, and a coin accepting system comprising a coin reader and a signal generator to the processor indicating accepted value credit for wagering, and near-field communication (NFC) systems such as e-Wallets, in which value transfers can be implemented by incidental contact, or relative movement of an exterior NFC transmitter/receiver to an interior (to the EGM) NFC transmitter/receiver.

The method may have the processor designate a distinct area on the video display screen for display of second collectible symbols, and may designate multiple distinct areas on the video display screen for display of multiple different first collectible symbols. The processor designates multiple distinct areas on the video display screen for display of multiple different first collectible symbols. The second collectible symbols may not be first provided in a wagering event at a number of second symbols equaling or exceeding the second predetermined number. The first collectible symbols again may not be first provided in a wagering event at a number of first symbols equaling or exceeding the first predetermined number. The method may enable collection of the second predetermined number of second symbols eliminates all collected first symbols from display on the video display as previously described. The collection of the predetermined first predetermined number of first collectible symbols may positively act on the player's achievement as by increasing a total amount of a winning outcome on the underlying wagering event, altering a paytable on a present or later winning outcome on the underlying wagering event, and/or initiating a series of free spins or initiating a bonus or jackpot event. The method may act by each first collectible symbol having a dedicated display area adjacent another different collectible first collectible symbol and each second collectible symbol has a dedicated display area in a region of the video display distal from the dedicated display area for the first collectible symbol. The method may have the first collectible symbols are awarded in number of collectible symbols equal to corresponding to numbers of same symbols in a payline of the underlying wagering event. For example, if the winning outcome on the first underlying game has three consecutive cherries, either one, two or three cherries can be deposited into an area dedicated for collection of cherry symbols as a collectible first symbol. Spaces available for collected first symbols will be of a limited number as maximum benefits with a maximum number of first collected symbols will not be exceeded and more symbol space becomes superfluous. A jackpot bonus may be achieved with maximum collection of one specific, or multiple specific first symbols being dedicated or automatically used when combined with specific results in the underlying game. For example, if there are three distinct collectible symbol types (e.g., cherries, bars and bells) and each one is at its maximum collective level, if a specific level of achievement is also attained in an underlying gaming event when the three maximum sets are active on the round of execution of the underlying gaming event, then a jackpot level or extremely high level of benefit will be achieved by the player.

The system may include a processor, video display, player input system and value-in and value-out system is selected from the group consisting of an electromechanical currency acceptor, coin or token acceptor, and a ticket in-ticket-out system.

Computer-Based Implementations

Methods of the present invention may be implemented in computer hardware, software, or computer hardware and software. A most common form of computer implementation is a stand-alone, single player electronic gaming machine with electronic player controls and one or more video output screens.

In computer-based embodiments, the gaming device preferably includes at least one processor, such as a microprocessor, a microcontroller-based platform, a suitable integrated circuit or one or more application-specific integrated circuits (ASIC's) or Field Programmable Gated Arrays (FPGA's). The processor is in communication with or operable to access or to exchange signals with at least one data storage or memory device, and/or a player monitor or monitors. In one embodiment, the processor and the memory device reside within the cabinet of a gaming device. Multiple gaming devices are typically connected to a casino information network.

The memory device stores program code and instructions, executable by the processor, to control the gaming device. The memory device also stores other data such as image data, event data, player input data, random or pseudo-random number generators, pay-table data or information, House Ways distributions and applicable game rules that relate to the play of the gaming device. In one embodiment, the memory device includes random access memory (RAM): which can include non-volatile RAM (NVRAM): magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device.

In other embodiments, part or all of the program code and/or operating data described above can be downloaded to the memory device through a suitable network. In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. The gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "processor" or "computer" or "controller" or "game controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome. It is also possible for templates or weighted templates of sets of tiles or paylines as disclosed in U.S. Pat. Nos. 6,159,096 and 6,117,009 (Yoseloff, which are incorporated by reference in their entirety) which disclose a method of configuring a video output gaming device to randomly generate game outcomes. The method includes the steps of selecting a set of game symbols, assigning a probability of occurrence to each symbol, selecting a plurality of outcome templates, each template comprising X variables, selecting a probability of occurrence for each outcome template, assigning a subset of symbols from the set of game symbols to each template for filling the positions, defining payouts for selected outcomes, and configuring a video output gaming device, which randomly selects a template, randomly selects a symbol for each variable in the template from the subset of game symbols assigned to the selected template, randomly fills at least a portion of the positions in the template and displays the outcome on a video output display. A video output gaming device programmed to randomly select a template, randomly select symbols to define the variables and randomly display the selected symbols is also disclosed.

In one embodiment, described in more detail below as a "chipless gaming platform", the gaming device includes one or more display devices that are mounted into a gaming table surface and are controlled by the processor in addition to or separately from the individual player monitors. The display devices are preferably connected to or mounted into the table structure. This may include a central display device which displays a primary game, dealer images, jackpot information, or information that is not specifically related to the game, such as sports information or winning events at other tables. This display device may also display any suitable secondary game associated with the primary game as well as information relating to the primary or secondary game (e.g., side bets, bonuses, jackpots and the like).

An alternative embodiment may include a central horizontal game display device and a vertically oriented virtual dealer display device as in Shuffle Master, Inc.'s Table Master™ gaming system. The central display device may display the primary game, any suitable secondary game associated or not associated with the primary game and/or information relating to the primary or secondary game. These display devices may also serve as digital glass operable to advertise games or other aspects of the gaming establishment. The gaming device includes a credit display 20 which displays a player's current number of credits, cash, account balance, or the equivalent. In one embodiment, the gaming device includes a bet display displays a player's amount wagered. In one embodiment, as described in more detail below, the gaming device includes a player tracking display which displays information regarding a player's play tracking status.

In yet another embodiment, at least one display device may be a mobile display device, such as a PDA or tablet PC that enables play of at least a portion of the primary or secondary game at a location remote from the gaming device. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In one embodiment, as described in more detail below, the display device includes a touch-screen with an associated touch-screen controller. The display devices may be of any suitable size and configuration, such as a square, a rectangle or an elongated rectangle. The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, images of dealers and the like.

Other forms of the invention are in the form of game software that is implemented in a variety of formats, such as internet gaming, PC practice play, hand-held game devices, wireless gaming devices and the like.

Chipless Gaming Table Implementation

One enabling system useful in the practice of the present invention is the use of playing cards with Chinese domino symbols which can be distributed for use with a system marketed under the name i-TABLE™ by Shuffle Master, Inc. of Las Vegas, Nev. That system includes: a) a physical gaming table; b) player monitors at each player position; c) a playing card reading and delivery system (e.g., commercially available shufflers and playing card delivery shoes with reading capability as sold under the Trade names of One2Six™ shuffler, Ace™ shuffler, I-DEAL™ shuffler, I-SHOE™ delivery shoe, etc.); d) a processor receiving information (numbers of cards, rank of cards, suits of cards, etc.) from the card reading and delivery systems; e) communication connectivity (hardwired or wireless) between necessary combinations of the card reading/delivery systems and the processor, the processor and the individual player monitors, and/or the card reading/delivery systems and the video monitors; and f) software in the processor that defines predetermined advantage for distributions of playing cards into multiple hands, game rules, hand history, and the like.

With regard to software f), it is understood in the practice of the present technology that this is not complex software that reads individual symbol positions randomly disposed on a screen and read alignment of those symbols on paylines, even when the symbols indicate rand and suit (as in player hand cards and determines advantageous card distributions for a first time by extensive calculations). Rather, the entire range of possibilities of hands and alignments (e.g., all possible five card sets dealt to players in poker-style games) is known in poker style games.

A preferable symbol or card handling device for administering a video reel-type-style game is a hand-forming shuffler with integrated card recognition technology, from which playing cards are supplied, with a least a rank/count (and preferable also suit) of individual packs of cards are known before the cards are removed and delivered to player positions and/or the banker position. The card delivery system 102 is in communication with the controller 128 by wired or wireless communication methods. Communication between the various system components is not limited to electronic or electrical signals, but may include optical signals, audio signals, magnetic transmission or the like.

The individual player position processors (not shown) are preferable graphics processors and not full content CPUs as a cost saving, space saving, and efficiency benefit. With the reduced capacity in the processor as compared to a CPU, there is actually reduced likelihood of tampering and fraudulent input.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown, or in a more horizontal (table like) display unit. Viewable through the main door is a video display monitor 34 and an information panel 36. The display monitor 34 will typically be a cathode ray tube, high resolution flat-pane LCD LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaining machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device, Thus, those of skill in the art will understand that the n present invention, as described below, can be deployed on most any gaming machine now available or hereafter developed.

Some preferred gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaining jurisdiction and reinstalled on the gaining machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaining machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report: voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, the Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights within the separate mechanical (or electronic) separately, individually wagerable gaming system 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 1A:
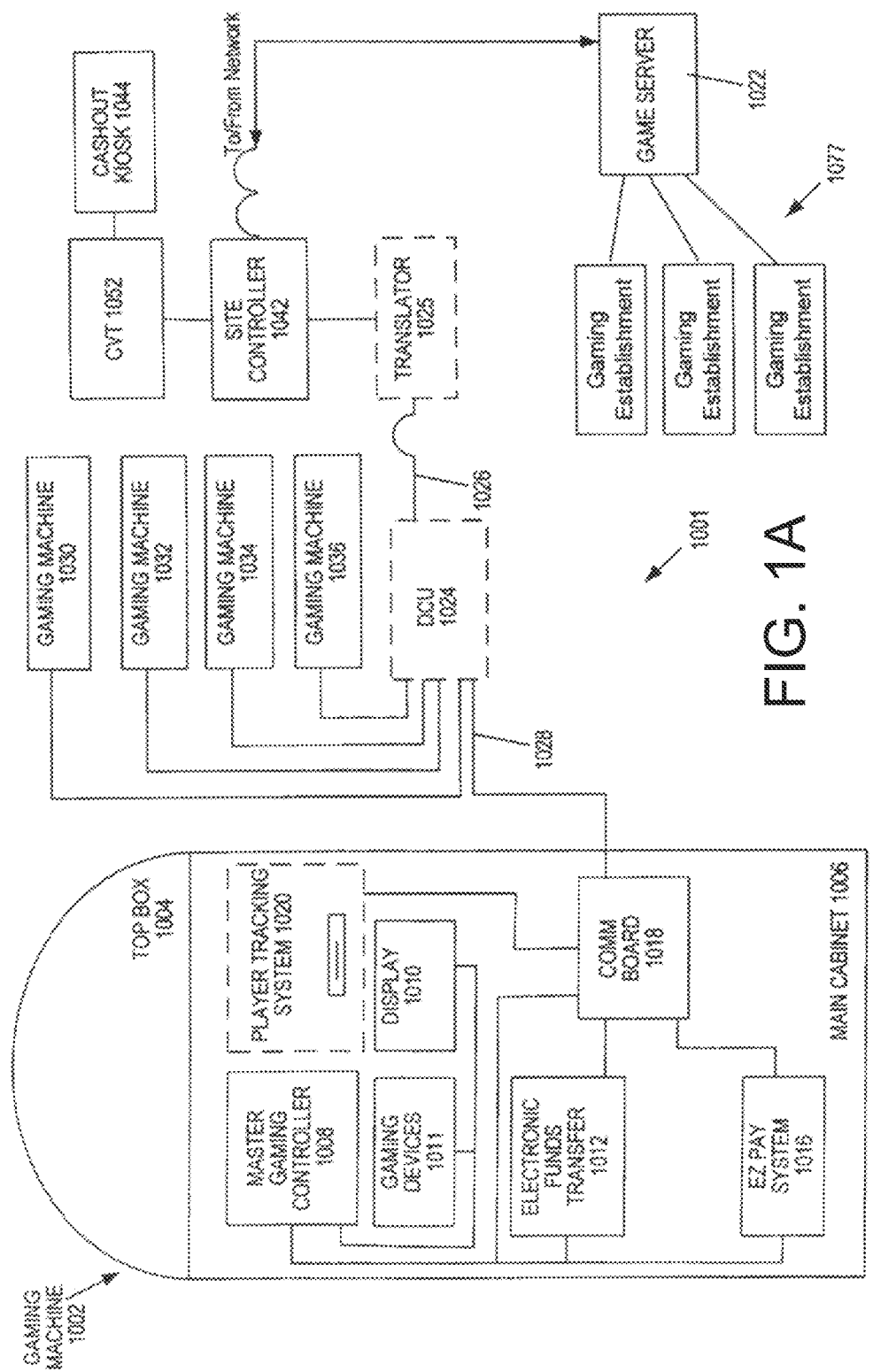
FIG. 1A shows a schematic for an electronic system for enabling play of the gaming method described herein.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022.

Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system, and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Figure 1B:
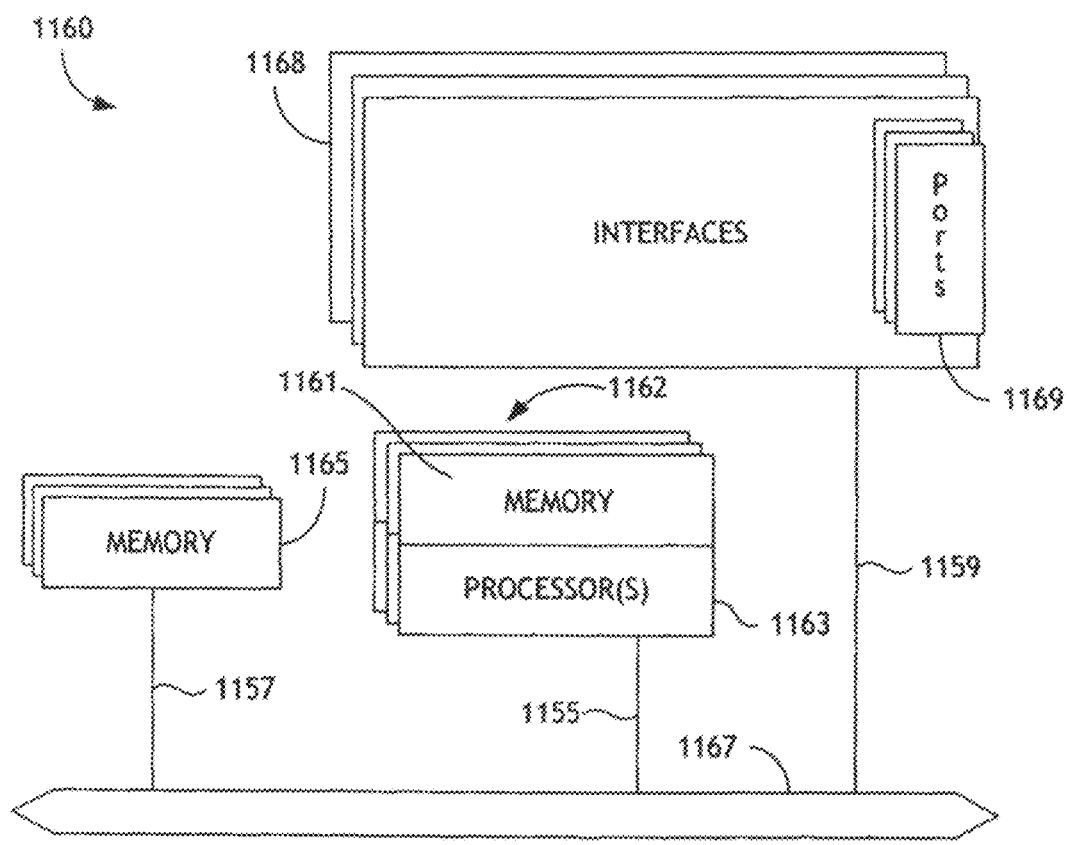
FIG. 1B shows another schematic for an electronic system for enabling play of the gaming method described herein.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention also relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

Figure 2:
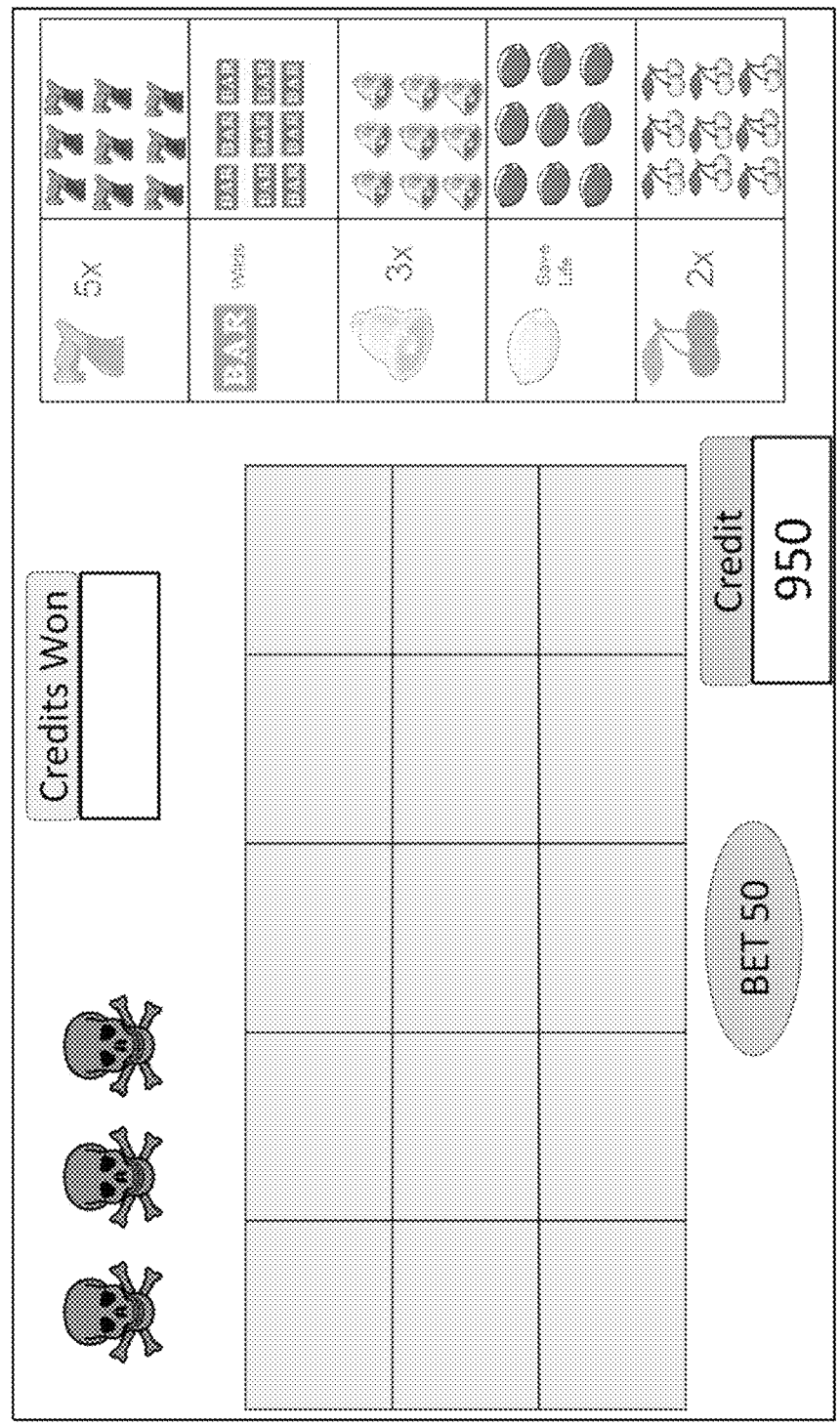
FIG. 2 shows a screen shot of a first screen before any wagers have been made and before active symbols have been provided.

The player value-in-value-out system may be selected from the group consisting of a) a currency validator with a motor to advance currency, b) a ticket-in-ticket-out system having a motor to advance tickets, a ticket reader and a ticket printer, c) a near field communication transmitter receiver in communication with the processor, and d) a coin acceptor and validator, FIG. 2 shows a screen shot of a first screen before any wagers have been made and before active symbols have been provided.

Figure 3:
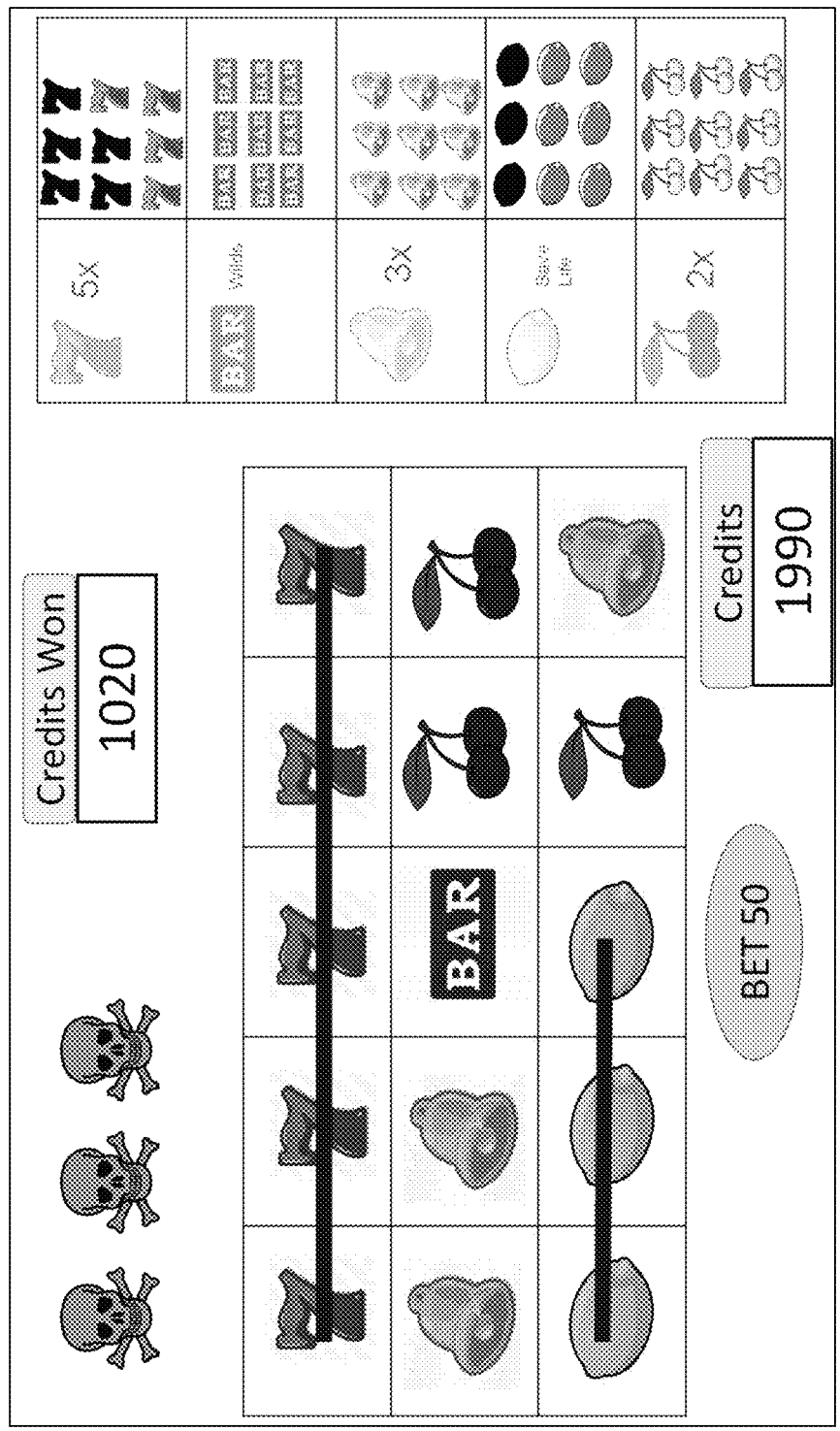
FIG. 3 shows a screen shot of a second screen after a wager has been made and two potentially positive-acting symbols and no potentially negative acting symbols (e.g., the shaded "skull" positions) have been delivered.

FIG. 3 shows a screen shot of a second screen after a wager has been made and two potentially positive-acting symbols and no potentially negative acting symbols (e.g., the shaded "skull" positions) have been delivered.

Figure 4:
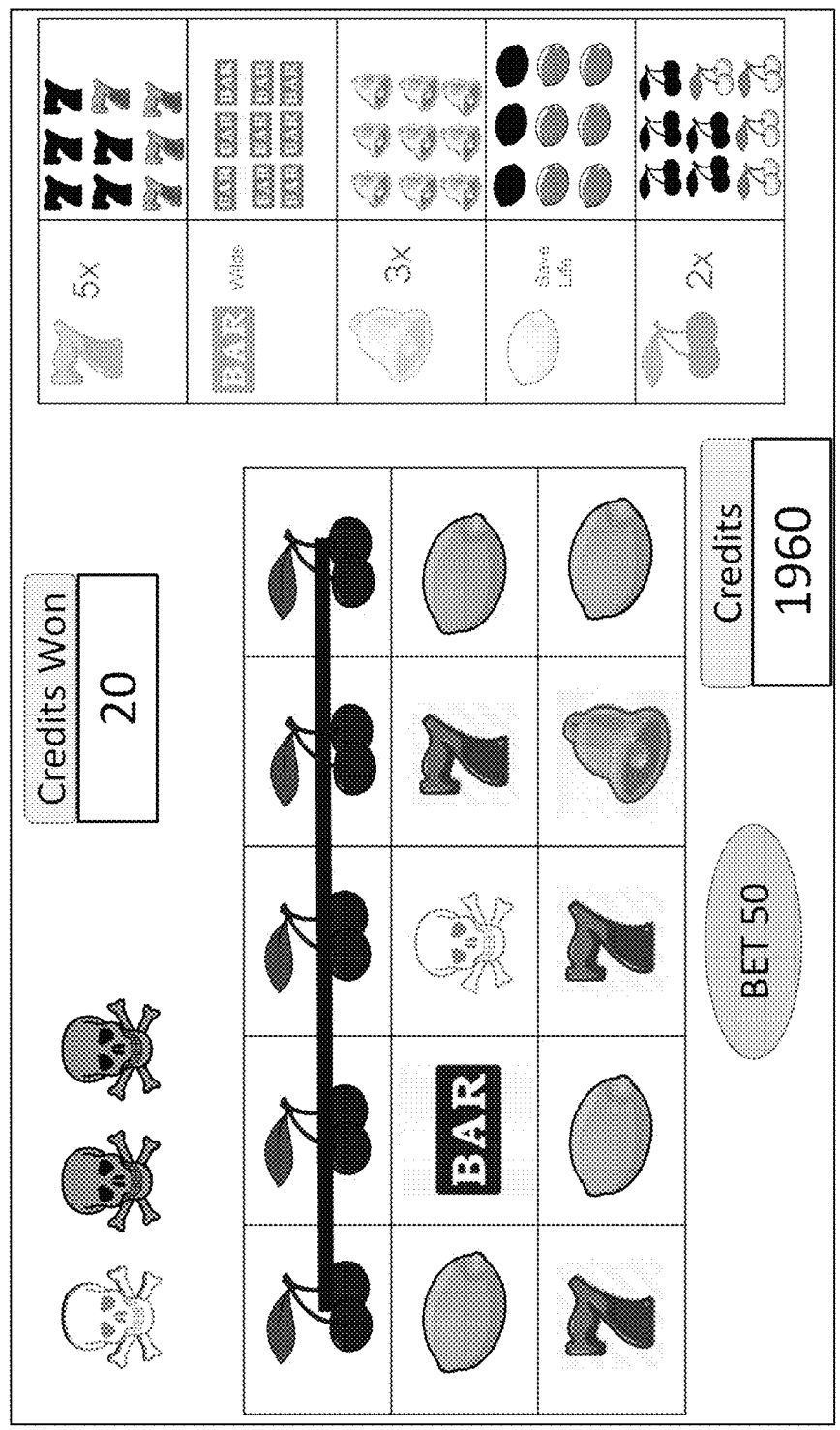
FIG. 4 shows a screen shot of a third screen after a wager has been made and one potentially positive-acting symbols and one potentially negative-acting negative acting symbols (e.g., the white skull in the 3×5 frames that will be added to shaded "skull" positions) have been delivered. The potentially positive-acting collected symbols from FIG. 3 are shown in a display column on the right side of the third screen shot.

FIG. 4 shows a screen shot of a third screen after a wager has been made and one potentially positive-acting symbols and one potentially negative-acting negative acting symbols (e.g., the white skull in the 3×5 frames that will be added to shaded "skull" positions) have been delivered. The potentially positive-acting collected symbols from FIG. 3 are shown in a display column on the right side of the third screen shot.

Figure 5:
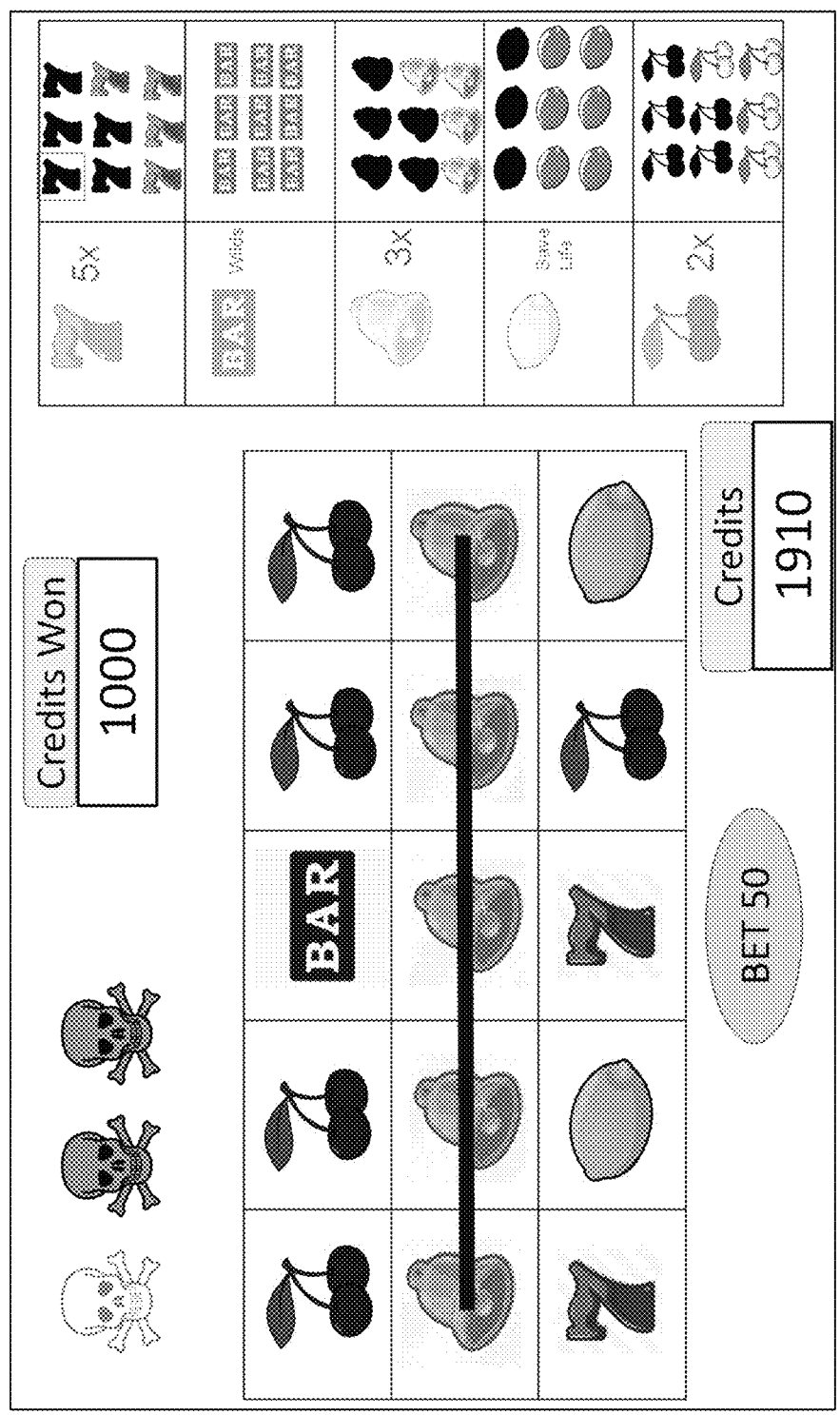
FIG. 5 shows a screen shot of a second screen after a wager has been made and one row of five bells acting as potentially positive-acting symbols and one potentially negative acting symbols from a previous round (e.g., added as a white skull to the shaded "skull" positions) have been delivered, but no new potentially negative acting symbols have been delivered.

FIG. 5 shows a screen shot of a second screen after a wager has been made and one row of five bells acting as potentially positive-acting symbols and one potentially negative acting symbols from a previous round (e.g., added as a white skull to the shaded "skull" positions) have been delivered, but no new potentially negative acting symbols have been delivered.

Figure 6:
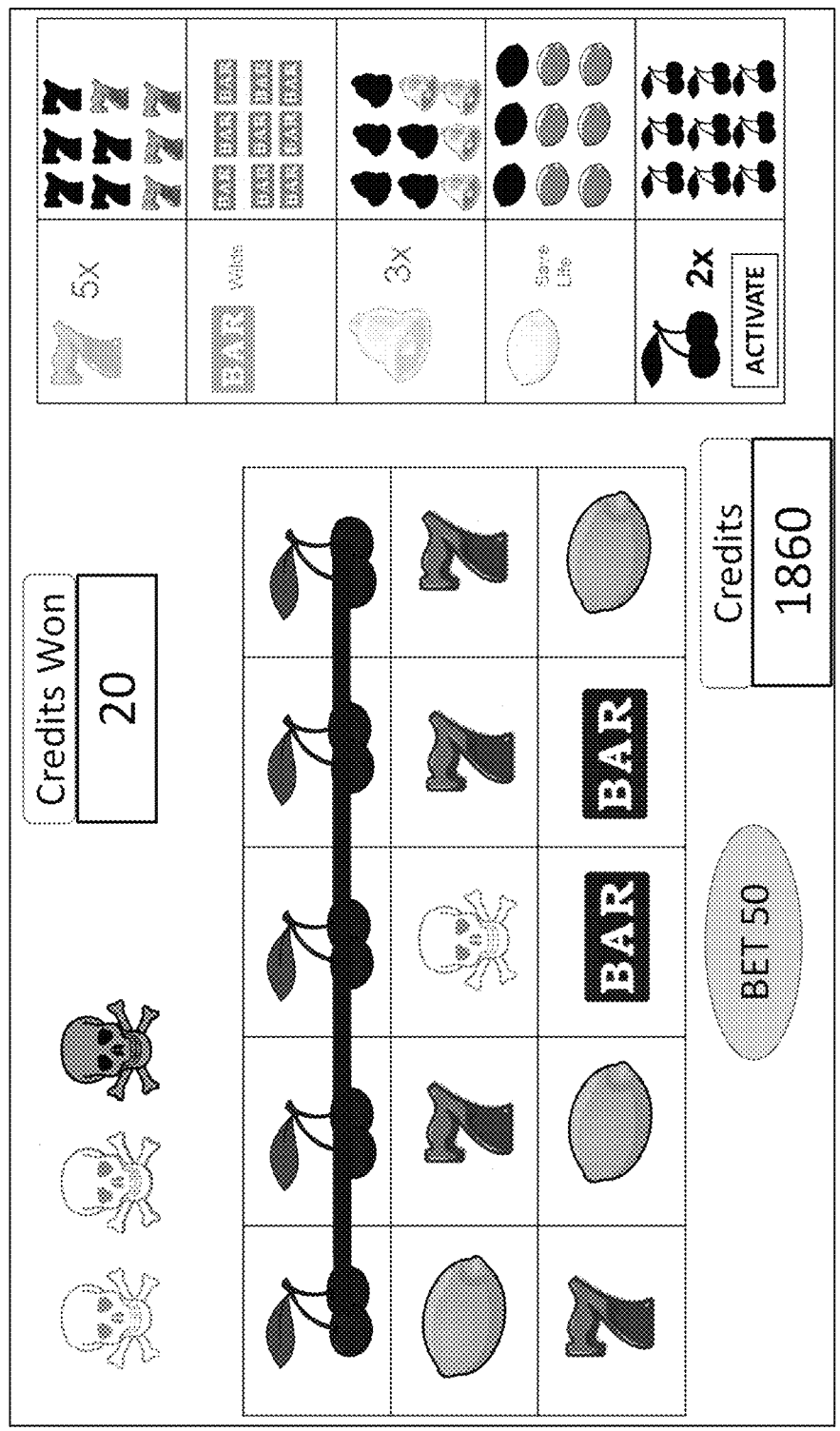
FIG. 6 shows a screen shot of a second screen after a wager has been made and one row of five cherries acting as potentially positive-acting symbols and one additional potentially negative acting symbols (e.g., which will later be added as a white skull to the shaded "skull" positions) have been delivered.

FIG. 6 shows a screen shot of a second screen after a wager has been made and one row of five cherries acting as potentially positive-acting symbols and one additional potentially negative acting symbols (e.g., which will later be added as a white skull to the shaded "skull" positions) have been delivered.

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention. For example, other formats such as internet gaming with a central server providing image and random outcome data, multiplayer platforms as shown in U.S. Pat. Nos. 8,272,958 and 7,264,243 may be used to provide the wager event of the present technology. Handheld devices in communication with a central server through wireless connections or through a downloaded app may also be used for actual wagering or social wagering. All documents cited herein are incorporated by reference in their entirety.

Another description of the present invention includes a method of implementing a wagering event on an underlying wagering event using a housing including a processor, memory, video display, player input controls and player value-in-value-out system selected from the group consisting of a) a currency validator with a motor to advance currency and b) a ticket-in-ticket-out system having a motor to advance tickets, a ticket reader and a ticket printer. The method includes:

a player position committing a wager on an underlying wagering event through the player input controls based on random event outcomes generated by random distribution of available symbols stored in memory, the distribution being into areas distributed along paylines;

the processor distributing symbols on the display screen of individual random symbols to the areas distributed along paylines at a player position with a committed wager;

distributing of random symbols to the areas distributed along paylines at the player position, the symbols including the possibility of at least two classes of collectible symbols, the collectible symbols can have either comprise a first class of symbol having positive game content effects upon collection of a first predetermined number of the first symbols, or a second class of symbol having an elimination effect on the first class of symbols upon collection of a second predetermined number of the second symbols; and, the processor enabling economically beneficial payout effects on winning outcomes or stored credit when the first predetermined number of the first symbol is reached and at least some collected first symbols eliminated upon collection of the second predetermined number of the second symbols;

wherein the processor randomly designates a distinct area on the video display screen for display of second collectible symbols, and the processor designating multiple distinct areas on the video display screen for display of multiple different first collectible symbols. The processor designates multiple distinct areas on the video display screen for display of multiple different first collectible symbols. The collection of the predetermined first predetermined number of first collectible symbols increases a total amount of a winning outcome on the underlying wagering event, altering a paytable on a present or later winning outcome on the underlying wagering event, initiates a series of free spins or initiating a bonus or jackpot event, and wherein each first collectible symbol has a dedicated display area adjacent another different collectible first collectible symbol and each second collectible symbol has a dedicated display area in a region of the video display distal from the dedicated display area for the first collectible symbol.

The invention claimed is:

1. A method of implementing a wagering event on an underlying wagering event using a processor, memory, video display, player input controls and a player value-in-value-out system selected from the group consisting of a) a currency validator with a motor to advance currency, b) a ticket-in-ticket-out system having a motor to advance tickets, a ticket reader and a ticket printer, c) a near field communication transmitter receiver in communication with the processor, and d) a coin acceptor and validator, the method comprising:

a player position committing a wager on an underlying wagering event through the player input controls based on random event outcomes generated by random distribution of available symbols stored in memory, the distribution being into areas distributed along paylines;

the processor distributing symbols on the display screen of individual random symbols to the areas distributed along paylines at a player position with a committed wager;

distributing of random symbols to the areas distributed along paylines at the player position, the symbols including the possibility of at least two classes of collectible symbols, the collectible symbols can have either comprise a first class of symbol having positive game content effects upon collection of a first predetermined number of the first symbols, or a second class of symbol having an elimination effect on the first class of symbols upon collection of a second predetermined number of the second symbols; and, the processor enabling economically beneficial payout effects on winning outcomes or stored credit when the first predetermined number of the first symbol is reached and at least some collected first symbols eliminated upon collection of the second predetermined number of the second symbols.

2. The method of claim 1 wherein the method is executed on an electronic gaming system including a main processor, video display system, a memory including content of virtual images for the random playing card symbols, player input controls, and a value-in and value out system selected from the group consisting of the currency validator and the ticket-in-ticket-out system, that received physical input relating to value committed to the committed wager, and there are at least three classes of symbols, wherein a third class of symbol having a neutral effect on both the first and second class of symbols.

3. The method of claim 1 wherein the method is executed on single player position electronic slot machine having a value-in-value out system selected from the group consisting of ticket-in-ticket-out input comprising a ticket reader and a ticket printer with a motor that retracts tickets, a currency accepting system comprising a currency reader with a motor to retract currency into a housing and a signal generator to the processor indicating accepted value credit for wagering, and a coin accepting system comprising a coin validator and a signal generator to the processor indicating accepted value credit for wagering.

4. The method of claim 3 wherein the processor designates a distinct area on the video display screen for display of second collectible symbols.

5. The method of claim 4 wherein the processor designates multiple distinct areas on the video display screen for display of multiple different first collectible symbols.

6. The method of claim 4 wherein second collectible symbols cannot be first provided in a wagering event at a number of second symbols equaling or exceeding the second predetermined number.

7. The method of claim 4 wherein first collectible symbols cannot be first provided in a wagering event at a number of first symbols equaling or exceeding the first predetermined number.

8. The method of claim 4 wherein collection of the second predetermined number of second symbols eliminates all collected first symbols from display on the video display.

9. The method of claim 3 wherein the processor designates multiple distinct areas on the video display screen for display of multiple different first collectible symbols.

10. The method of claim 3 wherein second collectible symbols cannot be first provided in a wagering event at a number of second symbols equaling or exceeding the second predetermined number.

11. The method of claim 3 wherein first collectible symbols cannot be first provided in a wagering event at a number of first symbols equaling or exceeding the first predetermined number.

12. The method of claim 3 wherein collection of the second predetermined number of second symbols eliminates all collected first symbols from display on the video display.

13. The method of claim 3 wherein collection of the predetermined first predetermined number of first collectible symbols increases a total amount of a winning outcome on the underlying wagering event, altering a paytable on a present or later winning outcome on the underlying wagering event, initiates a series of free spins or initiating a bonus or jackpot event.

14. The method of claim 3 wherein collection of the predetermined first predetermined number of first collectible symbols increases a total amount of a winning outcome on the underlying wagering event, altering a paytable on a present or later winning outcome on the underlying wagering event, initiates a series of free spins or initiating a bonus or jackpot event.

15. The method of claim 14 wherein each first collectible symbol has a dedicated display area adjacent another different collectible first collectible symbol and each second collectible symbol has a dedicated display area in a region of the video display distal from the dedicated display area for the first collectible symbol.

16. The method of claim 3 wherein the first collectible symbols are awarded in a number of collectible symbols equal to corresponding to numbers of same symbols in a payline of the underlying wagering event.

17. The method of claim 3 wherein the bet wager which is independently resolved from the committed wager.

18. A method of implementing a wagering event on an underlying wagering event using a housing including a processor, memory, video display, player input controls and player value-in-value-out system selected from the group consisting of a) a currency validator with a motor to advance currency and b) a ticket-in-ticket-out system having a motor to advance tickets, a ticket reader and a ticket printer, the method comprising:

a player position committing a wager on an underlying wagering event through the player input controls based on random event outcomes generated by random distribution of available symbols stored in memory, the distribution being into areas distributed along paylines;

the processor distributing symbols on the display screen of individual random symbols to the areas distributed along paylines at a player position with a committed wager;

distributing of random symbols to the areas distributed along paylines at the player position, the symbols including the possibility of at least two classes of collectible symbols, the collectible symbols can have either comprise a first class of symbol having positive game content effects upon collection of a first predetermined number of the first symbols, or a second class of symbol having an elimination effect on the first class of symbols upon collection of a second predetermined number of the second symbols; and, the processor enabling economically beneficial payout effects on winning outcomes or stored credit when the first predetermined number of the first symbol is reached and at least some collected first symbols eliminated upon collection of the second predetermined number of the second symbols;

wherein the processor randomly designates a distinct area on the video display screen for display of second collectible symbols, and the processor designating multiple distinct areas on the video display screen for display of multiple different first collectible symbols.

19. The method of claim 18 wherein the processor designates multiple distinct areas on the video display screen for display of multiple different first collectible symbols.

20. The method of claim 18 wherein collection of the predetermined first predetermined number of first collectible symbols increases a total amount of a winning outcome on the underlying wagering event, altering a paytable on a present or later winning outcome on the underlying wagering event, initiates a series of free spins or initiating a bonus or jackpot event, and wherein each first collectible symbol has a dedicated display area adjacent another different collectible first collectible symbol and each second collectible symbol has a dedicated display area in a region of the video display distal from the dedicated display area for the first collectible symbol.

* * * * *